(12) United States Patent
Begin et al.

(10) Patent No.: US 10,746,099 B1
(45) Date of Patent: Aug. 18, 2020

(54) MULTI-STEP BORE TURBOCHARGER

(71) Applicant: GM Global Technology Operations LLC, Detroit, MI (US)

(72) Inventors: Louis Begin, Rochester, MI (US); Dingfeng Deng, Auburn Hills, MI (US); Rachit Garg, Bangalore (IN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 16/374,250

(22) Filed: Apr. 3, 2019

(51) Int. Cl.
| | |
|---|---|
| *F02C 6/12* | (2006.01) |
| *F02B 39/14* | (2006.01) |
| *F04D 29/12* | (2006.01) |
| *F02B 33/40* | (2006.01) |

(52) U.S. Cl.
CPC ............ *F02C 6/12* (2013.01); *F02B 33/40* (2013.01); *F02B 39/14* (2013.01); *F04D 29/122* (2013.01); *F05D 2220/40* (2013.01); *F05D 2240/55* (2013.01)

(58) Field of Classification Search
CPC .. F02C 6/12; F02B 33/40; F02B 39/14; F04D 29/122; F05D 2220/40; F05D 2240/55; F16J 15/164; F12J 15/4472
See application file for complete search history.

(56) References Cited

U.S. PATENT DOCUMENTS

| | | | | |
|---|---|---|---|---|
| 3,961,867 | A * | 6/1976 | Woollenweber | F01D 5/025 417/407 |
| 4,196,910 | A * | 4/1980 | Aizu | F01D 11/00 277/419 |
| 4,198,063 | A * | 4/1980 | Shimizu | F01D 11/02 277/387 |
| 4,265,456 | A * | 5/1981 | Atkin | F16J 15/3468 277/407 |
| 4,314,705 | A * | 2/1982 | Shimizu | F16J 15/004 277/346 |
| 4,447,062 | A * | 5/1984 | Leicht | F01D 11/003 277/347 |
| 4,865,332 | A * | 9/1989 | Ruetz | F01D 11/003 277/347 |
| 4,986,733 | A * | 1/1991 | Fleury | F01D 5/025 415/230 |
| 5,076,765 | A * | 12/1991 | Yagi | F01D 25/183 277/366 |

(Continued)

*Primary Examiner* — Jesse S Bogue

(57) ABSTRACT

A turbocharger includes a compressor housing, turbine housing, and center housing between the compressor and turbine housings. A turbine wheel is disposed in the turbine housing on a turbine shaft. A compressor wheel having a shank is disposed in the compressor housing on the turbine shaft. The shank has outer and reduced portions. The reduced portion has a smaller diameter than the outer portion. A backplate is mounted to the compressor housing adjacent the compressor wheel and defines a stepped cylindrical bore with a maximum diameter portion and a minimum diameter portion having a smaller diameter than the maximum portion. The outer portion is disposed in the maximum portion. The reduced portion is disposed in the minimum portion. The outer diameter of the shank is greater than or equal to the minimum diameter of the backplate, and the stepped cylindrical bore and the shank define a variable width gap.

20 Claims, 4 Drawing Sheets

(56) References Cited

U.S. PATENT DOCUMENTS

| | | | | |
|---|---|---|---|---|
| 5,890,881 | A * | 4/1999 | Adeff | F01D 25/145 |
| | | | | 415/111 |
| 7,066,719 | B2 * | 6/2006 | Aguilar | F01D 11/003 |
| | | | | 277/419 |
| 7,223,077 | B2 * | 5/2007 | Nishiyama | F04D 29/266 |
| | | | | 416/204 A |
| 7,837,448 | B2 * | 11/2010 | Shimizu | F01D 11/003 |
| | | | | 123/559.1 |
| 8,517,679 | B2 * | 8/2013 | Schlienger | F01D 11/003 |
| | | | | 277/434 |
| 8,926,274 | B2 * | 1/2015 | Kuzi | F01D 25/162 |
| | | | | 415/203 |
| 9,169,738 | B2 * | 10/2015 | Schlienger | F01D 25/125 |
| 2016/0356283 | A1 * | 12/2016 | Futae | F02B 39/14 |

* cited by examiner

MULTI-STEP BORE TURBOCHARGER

INTRODUCTION

The present disclosure relates to an internal combustion engine having forced induction, and in particular, a turbocharger.

Turbochargers increase a volume and density of air drawn into the internal combustion engine during an intake stroke. More specifically, turbochargers provide positive pressure to the intake tract of an internal combustion engine by using a compressor wheel in a compressor housing coupled to and driven by an exhaust turbine in a turbine housing of the turbocharger. A pressure differential exists between the compressor housing and the center housing of the turbocharger and can result in air and/or lubricant passing between the compressor housing and the center housing under high-pressure differentials.

An annular piston ring seal is often used to limit the amount of air and/or lubricant that may pass between the compressor housing and the center housing when the turbocharger is being used to generate boost. The piston ring seals do provide known restriction or constriction of an air flow path. However, in order to achieve significant reductions in blow-by and to hit emissions, fuel economy, and volumetric efficiency targets for a particular application, it may be necessary to increase a quantity of piston ring seals used. Utilizing an increased number of piston ring seals can increase the cost, physical and assembly complexity of the turbocharger.

Thus, while current technologies achieve their intended purpose, there is a need for a new and improved turbocharger that provides the benefits of a restricted air flow path or a restricted blow-by path while maintaining or improving the performance of a turbocharger and reducing the cost and complexity of manufacturing and assembling the turbocharger.

SUMMARY

According to several aspects of the present disclosure, a turbocharger includes a compressor housing defining a compressor chamber. The turbocharger also includes a turbine housing defining a turbine chamber, and a center housing disposed axially between the compressor housing and the turbine housing. A turbine wheel is disposed in the turbine chamber, and a turbine shaft is connected to the turbine wheel. A compressor wheel is disposed in the compressor chamber and connected to the turbine shaft opposite from the turbine wheel. The compressor wheel has a shank with a cylindrical outer diameter portion and a cylindrical reduced diameter portion. The cylindrical reduced diameter portion has a diameter smaller than the cylindrical outer diameter portion. A backplate is mounted to the compressor housing adjacent to the compressor wheel. The annular backplate defines a stepped cylindrical bore having a maximum diameter portion and a minimum diameter portion. The minimum diameter portion extends radially inward from the maximum diameter portion and has a diameter smaller than the maximum diameter portion. The cylindrical outer diameter portion is disposed within the maximum diameter portion, and the cylindrical reduced diameter portion is disposed within the minimum diameter portion. The cylindrical outer diameter of the compressor wheel is greater than or equal to the minimum diameter portion of the annular backplate. The stepped cylindrical bore and the shank define a gap having a variable width.

In another aspect of the present disclosure the gap between the cylindrical outer diameter and the cylindrical reduced diameter portion of the compressor wheel define a circuitous blowby path with the maximum diameter portion and the minimum diameter portion of the annular backplate.

In yet another aspect of the present disclosure the turbocharger includes a bearing sandwiched between the annular backplate and the compressor housing, the bearing rotatably supporting the turbine shaft, and separated from the compressor wheel by an annular washer.

In yet another aspect of the present disclosure an annular piston ring seal disposed within and in contact with the minimum diameter portion of the stepped cylindrical bore. The stepped cylindrical bore forms a sealing land between the annular piston ring seal and the cylindrical reduced diameter portion of the compressor wheel.

In yet another aspect of the present disclosure the sealing land defines a circuitous blowby path having a predetermined shape and a predetermined path length selected to substantially eliminate blowby from a high-pressure zone in the compressor housing through the center housing to a low-pressure zone in the turbine housing. The high-pressure zone is at a higher atmospheric pressure than the low-pressure zone.

In yet another aspect of the present disclosure the cylindrical reduced diameter portion of the compressor wheel has an axial reduced diameter portion width.

In yet another aspect of the present disclosure the annular piston ring seal has an axial ring width, and the minimum diameter portion has an axial step width. The axial ring width is greater than the axial step width, and the axial reduced diameter portion width is greater than the axial ring width.

In yet another aspect of the present disclosure the stepped cylindrical bore further includes an outward-facing surface extending radially inward towards the turbine shaft from the maximum diameter portion to the minimum diameter portion of the stepped cylindrical bore. The minimum diameter portion extends axially towards the center housing to an inward-facing surface that extends radially away from the turbine shaft.

In yet another aspect of the present disclosure the stepped cylindrical bore of the annular backplate is axially aligned within and extends radially towards the cylindrical reduced diameter portion of the compressor wheel.

In yet another aspect of the present disclosure the outward-facing surface extends perpendicularly to the stepped cylindrical bore, and the internal diameter extends perpendicularly to both the outward-facing surface and the inward-facing surface. The outward-facing surface and the stepped cylindrical bore are joined at a radiused portion. The radiused portion has a predetermined radius that prevents the compressor wheel from binding against the annular backplate.

In yet another aspect of the present disclosure a turbocharger includes a compressor housing, a turbine housing, and a center housing disposed axially between the compressor housing and the turbine housing. The center housing includes a circumferentially extending wall defining a cavity. The cavity has opposite ends facing the compressor housing and the turbine housing respectively. The end facing the compressor housing being an open end. A bearing is disposed within the cavity and supported by the circumferentially extending wall. A shaft extends from a compressor end proximate the compressor housing to a turbine end proximate the turbine housing. The turbine shaft is rotatably supported by the bearing. An annular backplate is separate from each of the compressor housing, the turbine housing, and the center housing. The annular backplate is disposed in the open end and clamped to the compressor housing by a fastener. A compressor wheel is mounted on the compressor end of the turbine shaft. The compressor wheel has a cylindrical outer diameter portion and a reduced diameter portion. The cylindrical reduced diameter portion has a diameter smaller than the cylindrical outer diameter. A turbine wheel is mounted to the turbine end of the turbine shaft. The annular backplate defines a stepped cylindrical bore including one or more minimum diameter portions extending radially inward from one or more maximum diameter portions towards the compressor wheel and the turbine shaft. The compressor wheel includes a shank having one or more cylindrical outer diameter portions and one or more reduced diameter portions. The cylindrical outer diameter of the compressor wheel is greater than or equal to the one or more minimum diameter portions of the annular backplate. The stepped cylindrical bore and the one or more reduced diameter portions define a circuitous blowby path.

In yet another aspect of the present disclosure the one or more cylindrical outer diameter portions are disposed concentrically within the stepped cylindrical bore.

In yet another aspect of the present disclosure the turbocharger further includes an annular piston ring seal disposed on the minimum diameter portion of the annular backplate. The annular piston ring seal is located within and in rotatable sealing engagement with one or more reduced diameter portions of the shank. The one or more reduced diameter portions form a sealing land between the annular piston ring seal and the stepped cylindrical bore.

In yet another aspect of the present disclosure the annular piston ring seal has an axial ring width, and the one or more minimum diameter portions have an axial step width. The axial ring width is greater than the axial step width, and wherein the axial reduced diameter portion width is greater than the axial ring width.

In yet another aspect of the present disclosure the one or more minimum diameter portions are connected to the one or more maximum diameter portions by an outward-facing surface extending radially inward towards the turbine shaft from the one or more maximum diameter portions. The one or more minimum diameter portions extend axially towards the center housing to an inward-facing surface that extends radially outward and away from the turbine shaft.

In yet another aspect of the present disclosure the one or more minimum diameter portions of the annular backplate are axially aligned within and extend radially towards the cylindrical reduced diameter portion of the shank of the compressor wheel.

In yet another aspect of the present disclosure the outward-facing surface extends perpendicularly to the stepped cylindrical bore, and the one or more minimum diameter portions extend perpendicularly to both the outward-facing surface and the inward-facing surface.

In yet another aspect of the present disdosure the outward-facing surface and the stepped cylindrical bore are joined at a radiused portion, and the radiused portion has a predetermined radius prevents the compressor wheel from binding against the annular backplate.

In yet another aspect of the present disdosure the circuitous blowby path has a shape and path length selected to reduce or substantially eliminate blowby from a high-pressure zone in the compressor housing through the center housing to a low-pressure zone in the turbine housing. A portion of the circuitous blowby path is defined by a sealing land between the annular piston ring seal and the stepped cylindrical bore.

In yet another aspect of the present disclosure a turbocharger includes a compressor housing, a turbine housing, and a center housing disposed axially between the compressor housing and the turbine housing. The center housing includes a circumferentially extending wall defining a cavity, the cavity having opposite ends facing the compressor housing and the turbine housing respectively. The end facing the compressor housing is an open end. A bearing is disposed within the cavity and supported by the circumferentially extending wall. A shaft extends from a compressor end proximate the compressor housing to a turbine end proximate the turbine housing. The turbine shaft is rotatably supported by the bearing. A compressor wheel is mounted on the compressor end of the turbine shaft. The compressor wheel has a cylindrical outer diameter portion and a reduced diameter portion. The cylindrical reduced diameter portion has a diameter smaller than the cylindrical outer diameter. A turbine wheel is mounted to the turbine end of the turbine shaft. An annular backplate is separate from each of the compressor housing, the turbine housing, and the center housing. The annular backplate is disposed in the open end and clamped to the compressor housing. The annular backplate defines a stepped cylindrical bore having one or more minimum diameter portions extending radially inward from one or more maximum diameter portions of the stepped cylindrical bore. One or more annular piston ring seals are disposed within and in contact with the one or more minimum diameter portions. A diameter of the one or more minimum diameter portions is equal to or smaller than the cylindrical outer diameter portion of the compressor wheel. The one or more minimum diameter portions and the one or more annular piston ring seals form one or more sealing lands with the compressor wheel. The stepped cylindrical bore and the one or more reduced diameter portions define a circuitous blowby path having a predetermined shape and a predetermined path length. The predetermined shape and predetermined path length substantially eliminate blowby from a high-pressure zone in the compressor housing through the center housing to a low-pressure zone in the turbine housing, where the high-pressure zone is at higher atmospheric pressure than the low-pressure zone. A portion of the circuitous blowby path is defined by a sealing land between the annular piston ring seal and the stepped cylindrical bore.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
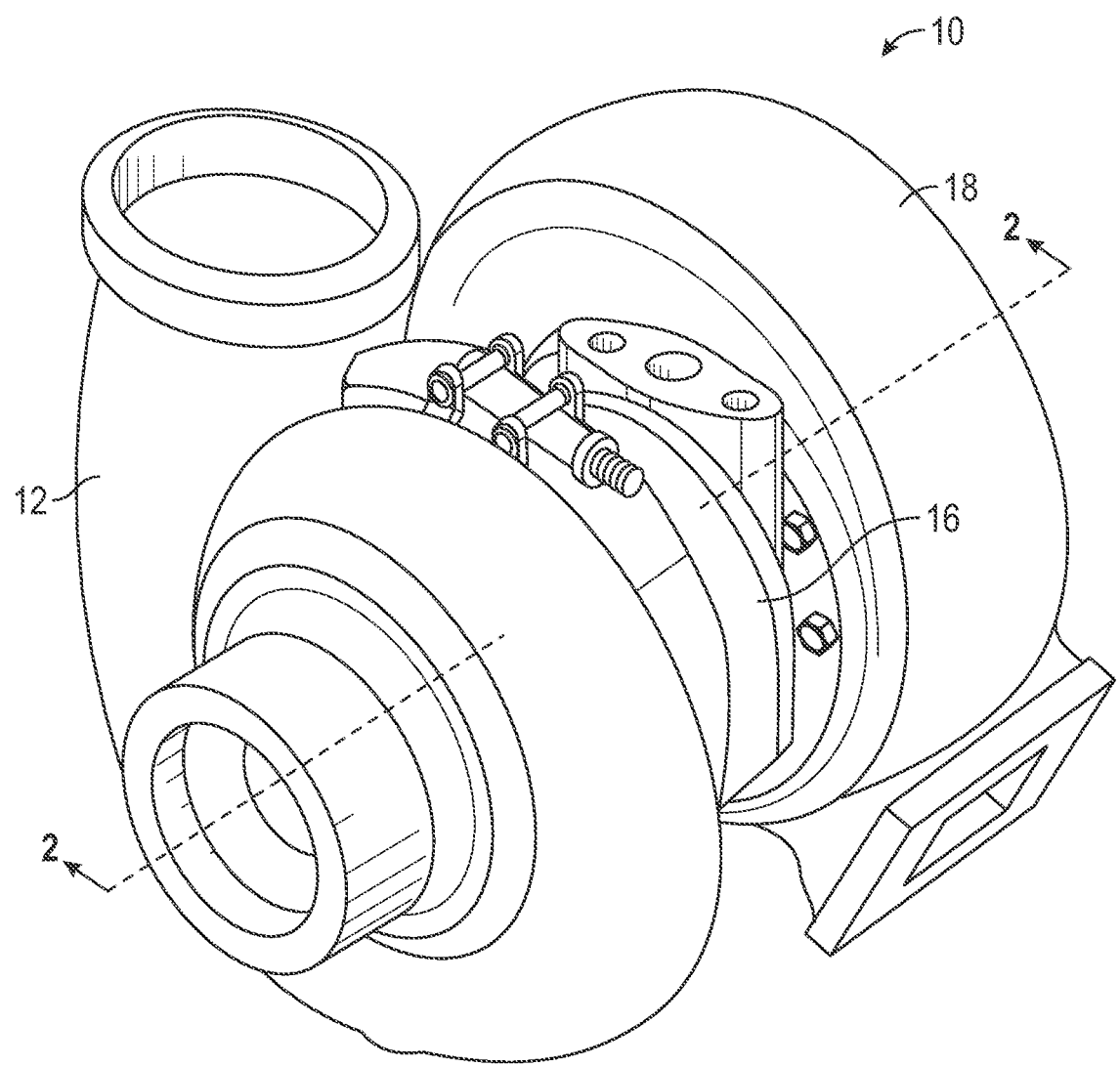
FIG. 1 is a perspective view of a turbocharger according to an exemplary embodiment.
Figure 2:
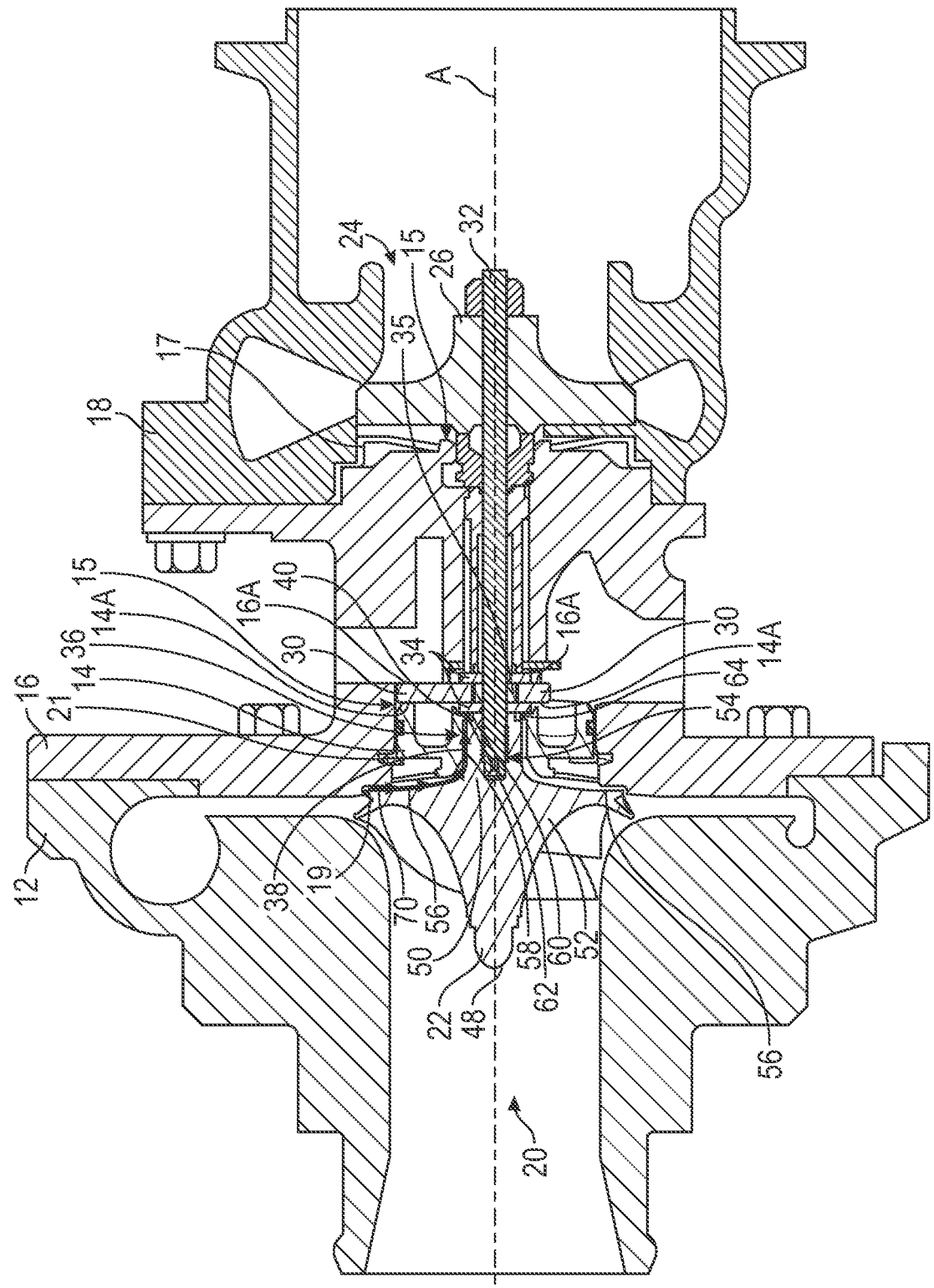
FIG. 2 is a sectional view of the turbocharger taken from FIG. 1 along line 2-2 according to an exemplary embodiment.

Referring to FIGS. 1 and 2, a turbocharger according to an exemplary embodiment of the present disclosure is shown generally at 10. The turbocharger 10 may be of any of a variety of different turbocharger types without departing from the scope or intent of the present disclosure. For example, the turbocharger 10 may be a single scroll turbocharger, a twin-scroll turbocharger, a variable geometry turbocharger, an electric turbocharger, or the like. In one aspect, the turbocharger 10 includes a compressor housing 12 with a backplate 14. The turbocharger 10 further includes a center housing 16. In some examples, the center housing 16 has a substantially cylindrical shape and defines a cavity 15. The cavity 15 has opposite ends 17, 19 facing the compressor housing 12 and a turbine housing 18 respectively. One of the opposite ends 17, 19 is an open end 19. The open end 19 faces the compressor housing 12 and is adapted to receive the annular backplate 14. In further examples, the portion of the center housing 16 including the open end 19 may be formed unitarily with the compressor housing 12.

Figure 3A:
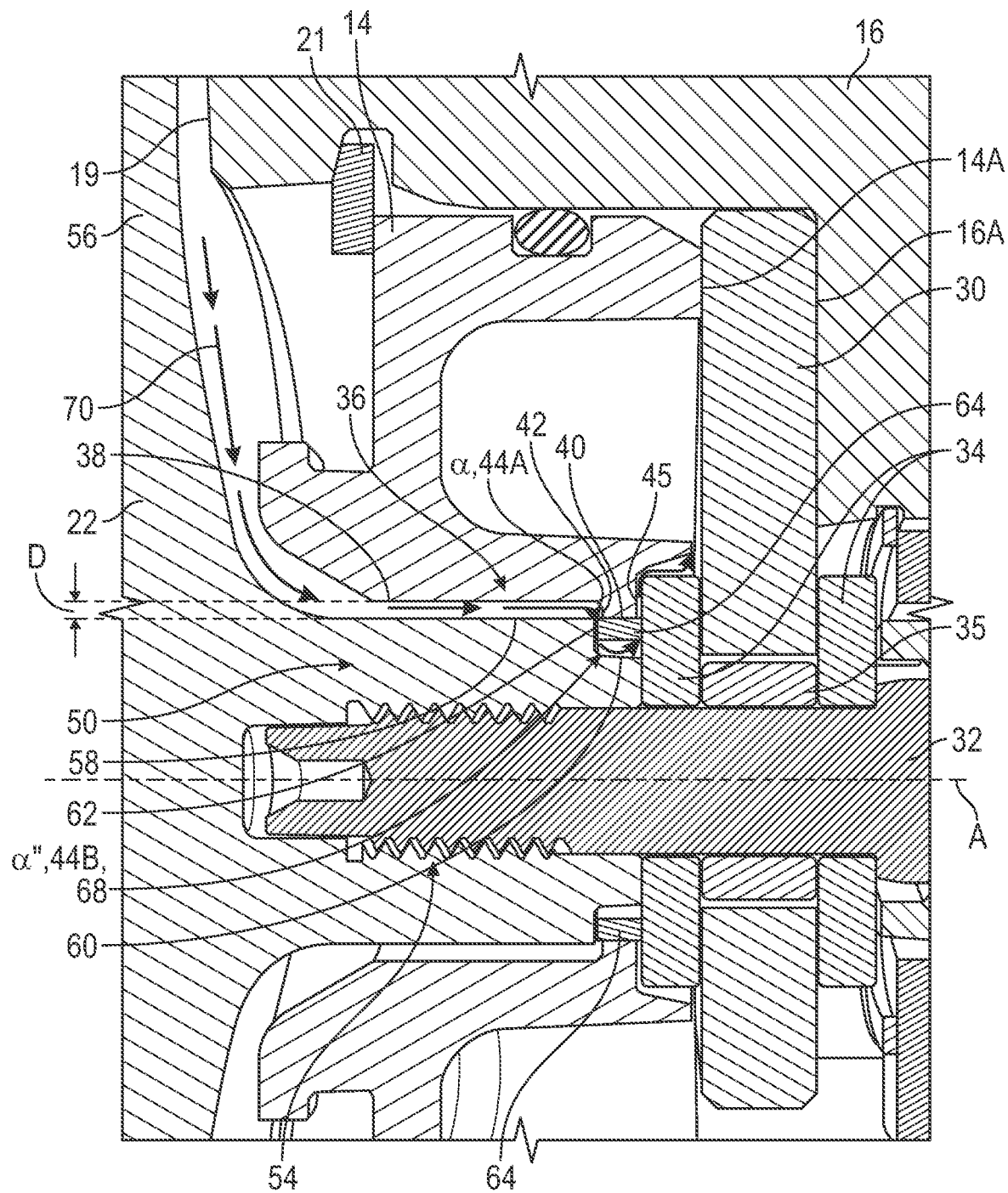
FIG. 3A is an enlarged sectional view of a portion of the exemplary turbocharger of FIG. 2 and depicting a backplate having a minimum diameter portion according to an exemplary embodiment.
Figure 3B:
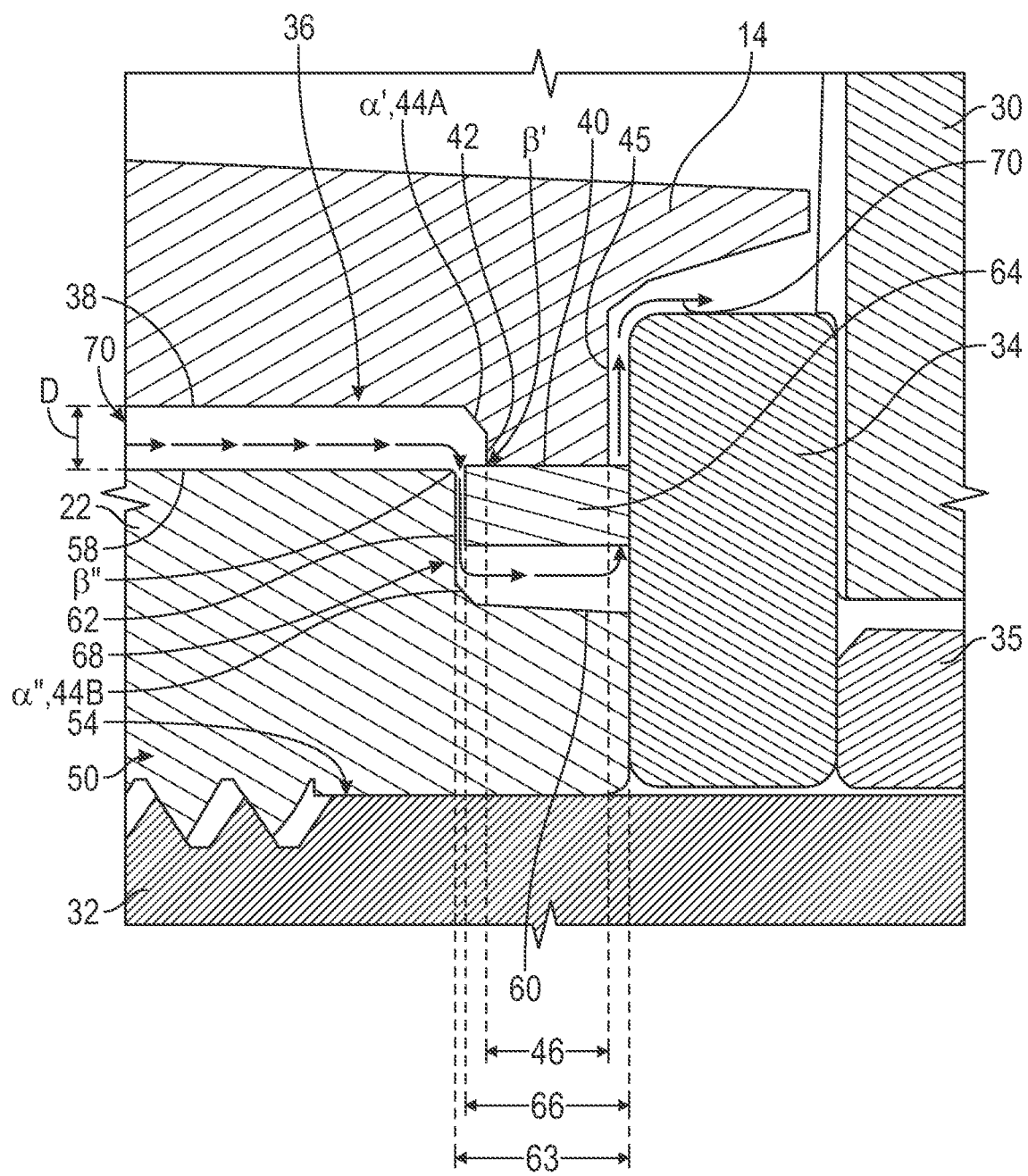
FIG. 3B is a further enlarged sectional view of a portion of the exemplary turbocharger of FIG. 3A depicting a detail of the minimum diameter portion of the annular backplate according to an exemplary embodiment.

Turning now to FIGS. 3A and 3B, and with continuing reference to FIGS. 1 and 2, the compressor housing 12 defines a compressor chamber 20. A compressor wheel 22 is disposed within the compressor chamber 20. The turbine housing 18 defines a turbine chamber 24. A turbine wheel 26 is disposed in the turbine chamber 24. In some examples, the annular backplate 14 is connected directly to the compressor housing 12. More specifically, the annular backplate 14 is connected to the compressor housing 12 by a fastener or fasteners 21. The fastener 21 may take any of a variety of different forms without departing from the scope or intent of the present disclosure. That is, the fastener 21 may be a circlip, an e-clip, a snap ring, or other fasteners 21 of the like. In an alternative embodiment, the annular backplate 14 of some examples is inserted into the open end 19 of the center housing 16 and retained or clamped therein by one or more fasteners 21.

A bearing 30 is sandwiched between the annular backplate 14 and the center housing 16. The center housing 16 and the annular backplate 14 each include bearing seat regions 16A, 14A, respectively, that receive the bearing 30 therein. A shaft 32 is rotatably received in and supported by the bearing 30. One or more annular washers 34 are sandwiched between the bearing 30 and the annular backplate 14. The one or more annular washers 34 are also sandwiched between the bearing 30 and the compressor wheel 22. The turbine shaft 32 is rotatable about an axis A. The annular washers 34 are formed of a metallic material providing desired surface friction and compression characteristics. In some examples, the annular washers 34 are made of steel, brass, or the like. The annular washers 34 are substantially flat discs having an orifice (not specifically shown) through which the turbine shaft 32 extends. The bearing 30 may be one of any of a variety of types including, but not limited to a thrust bearing, a ball bearing, a needle bearing, a sleeve bearing, or the like without departing from the scope or intent of the present disclosure. The bearing 30 is separated or supported around the turbine shaft 32 by a collar 35. The collar 35 is a cylindrical sleeve fitting around the turbine shaft 32 and within the bearing 30. In several aspects, the collar 35 helps to locate the bearing 30 on the turbine shaft 32 in both axial and radial directions. The collar 35 may be formed of any of a variety of materials, such as ceramics, composites, metals, metallic alloys or the like.

The annular backplate 14 has a stepped cylindrical bore 36. More specifically, the annular backplate 14 includes a maximum diameter portion 38 and a minimum diameter portion 40. Each of the maximum and minimum diameter portions 38, 40 are oriented about the axis A of the turbine shaft 32. The maximum diameter portion 38 has a larger diameter than the minimum diameter portion 40. In several aspects, the minimum diameter portion extends 40 radially inward from the maximum diameter portion. The maximum diameter portion 38 extends axially from the compressor chamber 20 toward the center housing 16. An outward-facing surface 42 connects the maximum diameter portion 38 to the minimum diameter portion 40. More specifically, the outward-facing surface 42 extends radially inward from the maximum diameter portion 38 and terminates at the minimum diameter portion 40, thereby forming an annular step or flange.

The outward-facing surface 42 is connected to the maximum diameter portion 38 at an angle α', and the outward-facing surface 42 is connected to the minimum diameter portion 40 at an angle 3'. It should be appreciated that the angles α' and β' may vary without departing from the scope or intent of the present disclosure. In several aspects, the angles α' and 3' are selected to reduce or substantially eliminate the potential for the compressor wheel 22 from binding or otherwise physically interfering with the annular backplate 14. Furthermore, with particular reference to angle α', the outward-facing surface 42 and the maximum diameter portion 38 are joined at a radiused portion 44A. The radiused portion 44A has a predetermined radius selected to prevent the compressor wheel 22 from binding against the annular backplate 14. The precise dimensions of the radiused portion 44A may vary substantially depending on the overall dimensions of the turbocharger 10, and the application for which the turbocharger 10 is to be used. For example, in a relatively large turbocharger 10 used in a large truck, semi, or the like, the radiused portion 44A may have a commensurately larger radius than the radiused portion 44A of a small turbocharger 10 intended for use in a motorcycle, a compact car, or the like.

In one example, both of the angles α and β are approximately 90°. That is, the outward-facing surface 42 extends perpendicularly to the maximum diameter portion 38 and the outward-facing surface 42 extends perpendicularly to the minimum diameter portion 38. Accordingly, the maximum and minimum diameter portions 38, 40 are parallel or substantially concentric and coaxial with one another. The maximum diameter portion 38 has a consistent diameter throughout and defines a cylindrical region of the annular backplate 14. The minimum diameter portion 40 also defines a cylindrical region of the annular backplate 14 having a consistent diameter throughout.

The minimum diameter portion 40 extends axially from the outward-facing surface 42 to an inward-facing surface 45. The inward-facing surface 45 is located proximate to the center housing 16 and extends radially outward and away from the turbine shaft 32. That is, the inward-facing surface 45 is substantially perpendicular to the minimum diameter portion 40. Accordingly, the inward-facing surface 45 and the outward-facing surface 42 are substantially parallel to one another. The minimum diameter portion 40 has an axial step width 46. The axial step width 46 is smaller than the axial distance for which the maximum diameter portion 38 extends.

The compressor wheel 22 extends from a nose 48 to a shank 50 with a plurality of radially extending three-dimensionally-formed compressor blades 52 formed therebetween. The compressor blades 52 may take any of a variety of forms without departing from the scope or intent of the present disclosure. For example, the compressor blades 52 may be split blades such that alternating compressor blades 52 extend for differing axial and/or radial distances than adjacent compressor blades 52. In another example, the compressor blades 52 may be forward or backward-curved. In a further example, the compressor blades 52 may have a straight radial structure such that each of the compressor blades 52 extends or emanates in a straight line perpendicular to the axis A of the turbine shaft 32. The compressor blades 52 may also reverse taper or have an increasing radial extent from the nose 48 toward the shank 50. A cylindrical aperture 54 is formed through at least a portion of the compressor wheel 22. In several aspects, the compressor wheel 22 includes a substantially disc-shaped rear plate 56. The shank 50 extends substantially perpendicularly to the disc-shaped rear plate 56 and towards the center housing 16 of the turbocharger 10. The shank 50 faces the center housing 16 of the turbocharger 10, while the nose 48 extends along axis A away from the center housing 16.

At least a portion of the shank 50 of the compressor wheel 22 is disposed within the maximum diameter portion 38 of the annular backplate 14. More specifically, the shank 50 of the compressor wheel 22 includes a cylindrical outer diameter portion 58 and a cylindrical reduced diameter portion 60. The outer diameter portion 58 of the shank 50 of the compressor wheel 22 is disposed within and fits concentrically into the maximum diameter portion 38 of the annular backplate 14. Likewise, the cylindrical reduced diameter portion 60 is received by and fits concentrically within the minimum diameter portion 40 of the annular backplate 14. A radial surface 62 is connected at an angle β" to the outer diameter portion 58. The radial surface 62 is also connected at an angle α" to the cylindrical reduced diameter portion 60. As with angles α' and β', it should be appreciated that the angles α" and β" may vary without departing from the scope or intent of the present disclosure. In several aspects, the angles α" and β" are selected to reduce or substantially eliminate the potential for the compressor wheel 22 from binding or otherwise physically interfering with the annular backplate 14. Furthermore, with particular reference to angle α", the radial surface 62 and the outer diameter portion 58 are joined at a radiused portion 44B. The radiused portion 44B has a predetermined radius selected to prevent the compressor wheel 22 from binding against the annular piston ring seal 64. The precise dimensions of the radiused portion 44B of the compressor wheel 22 may vary substantially depending on the overall dimensions of the turbocharger 10, and the application for which the turbocharger 10 is to be used.

The radial surface 62 is substantially parallel to and faces the outward-facing surface 42 of the annular backplate 14. The cylindrical reduced diameter portion 60 extends for an axial width, hereafter referred to as the axial reduced portion width 63. In several aspects, the axial reduced portion width 63 is greater than the axial step width 46. The axial reduced portion width 63 is greater than the axial step width 46 in order to allow for a predetermined amount of axial movement of the turbine shaft 32 and the compressor wheel 22 within the compressor housing 12 and the annular backplate 14 without physically contacting the compressor housing 12 or backplate 14. Furthermore, the cylindrical outer diameter portion 58 of the compressor wheel 22 is greater than or equal to the minimum diameter portion 40.

The shank 50 is inserted into the annular backplate 14 during assembly of the turbocharger 10. The shank 50 is substantially concentric with and spaced apart from the annular backplate 14 by a gap D. Gap D is measured from the maximum diameter portion 38 to the outer diameter portion 58, and from the minimum diameter portion 40 to the cylindrical reduced diameter portion 60. In several aspects, the gap D has a predetermined width or size selected for a particular turbocharger 10 application. For example, in a large turbocharger for use with a large capacity engine, the gap D is relatively large as compared to a smaller gap in a small turbocharger designed for use with a small capacity engine. Similarly, the quantity of turbochargers, the engine type (gasoline, diesel, etc.), and so forth may factor into the predetermined gap D for a particular turbocharger 10 application. The gap D may also vary along the axial extent of the shank 50 and the annular backplate 14. In several aspects, the gap D is selected to provide separation between the shank 50 and the annular backplate 14 and to decrease the potential for physical contact between the shank 50 and the annular backplate 14.

An annular piston ring seal 64 is disposed within and in contact with the minimum diameter portion 40 of the stepped cylindrical bore 36. The annular piston ring seal 64 sealingly engages with the cylindrical reduced diameter portion 60 of the shank 50 of the compressor wheel 22. Because the minimum diameter portion 40 of the annular backplate 14 has a smaller diameter than the cylindrical outer diameter portion 58 of the shank 50, the annular piston sealing ring 64 is disposed in and in rotational sealing engagement with the shank 50. The annular piston ring seal 64 also has an axial ring width 66. The axial ring width 66 is an axial distance for which the annular piston ring seal 64 extends. In several aspects, the axial ring width 66 is greater than the axial step width 46 while the axial reduced portion width 63 is greater than the axial ring width 66. Because the axial reduced portion width 63 is greater than the axial ring width 66, the annular piston ring seal 64 fits within the axial reduced portion width 63 without interfering with rotational movement of the shank 50 within the annular backplate 14. Likewise, because the shank 50 may experience axial displacement under certain operating conditions, by providing an axial ring width 66 greater than the axial step width 46, the annular piston ring seal 64 decreases the potential for the minimum diameter portion 40 of the annular backplate to physically contact the shank 50.

In combination with the stepped cylindrical bore 36, the annular piston ring seal 64 forms a sealing land 68 with the cylindrical reduced diameter portion 60 of the shank 50 of the compressor wheel 22. More generally, the circuitous blowby path 70 has a predetermined shape and a predetermined path length selected to substantially eliminate blowby from the high-pressure zone in the compressor housing 12 through the center housing 16 to the low-pressure zone in the turbine housing 18. The sealing land 68 defines a portion of the circuitous blowby path 70 through which pressurized air or other gasses may pass under certain operating conditions of the turbocharger 10.

Specifically, in operation and under boost, the compressor housing 12 of the turbocharger 10 generates a zone of high atmospheric pressure. By contrast, exhaust gasses flowing through the turbine housing 18 generate a zone of low atmospheric pressure that is lower than the high atmospheric pressure in the compressor housing 12. Since high-pressure tends to equalize with low-pressure, the pressure differential across the turbocharger 10 causes high-pressure air in the compressor housing 12 to try to move towards the low-pressure exhaust in the turbine housing 18.

Allowing high-pressure air from the compressor housing 12 to bleed through the center housing 16 to the turbine housing 18 creates several potential issues. For example, the turbocharger 10 may lose efficiency because high-pressure air that would otherwise enter the engine is being lost to the exhaust or ventilation, the turbocharger 10 may not operate up to its potential. In a second example, proper lubrication of the turbocharger 10 may be compromised by the introduction of air into the center housing 16, bearing(s) 30, shaft 32, of the turbocharger 10, and so forth. That is, high-pressure air may displace oil or other lubricant that would otherwise lubricate and otherwise decrease frictional stresses on the bearing(s) 30, shaft 32, and the like. In a third example, relating somewhat to the second example, air entering the center housing 16 may also force lubricant out of what is otherwise a substantially closed system and into the intake or exhaust of the engine. Accordingly, lubricant, such as oil may be lost to the exhaust directly, or via combustion in the engine if the turbocharger 10 does not include a sufficient sealing land 68 to overcome such issues.

The circuitous blowby path 70 is defined more generally by the gap D over the entire axial and radial distance where the shank 50 and the annular backplate 14 have a rotational interface with one another, and by the interface between the annular piston sealing ring 64 and the cylindrical reduced diameter portion 60 of the shank 50. That is, high-pressure air from the compressor housing 12 may, under some circumstances, move behind the disc-shaped rear plate 56 of the compressor wheel 22 and enter the gap D between the shank 50 and the annular backplate 14. As the high-pressure air proceeds along the gap D between the maximum diameter portion 38 and the cylindrical outer diameter portion 58 towards the center housing 16, movement of the air is impeded by the presence of the minimum diameter portion 40 in combination with the cylindrical reduced diameter portion 60 of the shank 50. Moreover, because the annular piston sealing ring 64 is disposed on the minimum diameter portion 40 of the annular backplate 14 and within the cylindrical reduced diameter portion 60 of the shank 50, the flow of air towards the turbine housing 18 from the compressor housing 12 is further impeded. Specifically, because the cylindrical outer diameter portion 58 of the shank 50 of the compressor wheel 22 is greater than or equal to the minimum diameter portion 40, the annular piston sealing ring 64 is disposed in and in rotatable sealing engagement with the shank 50. The sealing land 68, therefore, is defined by the radial and axial dimensions of the annular piston sealing ring 64 where the annular piston sealing ring 64 is disposed within and in rotatable sealing engagement with the shank 50.

It should be appreciated that the gap D may have the same or differing physical dimensions along the axial and/or radial distance between the outer diameter portion 58 and the maximum diameter portion 38, and between the minimum diameter portion 40 and the cylindrical reduced diameter portion 60. Furthermore, while in the foregoing description, the stepped cylindrical bore 36 of the annular backplate 14 and the shank 50 of the compressor wheel 22 have been described as having only a single step defining two diameters each, both the stepped cylindrical bore 36 and the shank 50 may have more than two steps defining two or more diameters each without departing from the scope or intent of the present disclosure. For example, the shank 50 may have multiple outer diameter portions 58 and reduced diameter portions 60, and the stepped cylindrical bore 36 may have multiple maximum diameter portions 38 and minimum diameter portions 40. In an example in which the shank 50 has multiple reduced diameter portions 60 and the stepped cylindrical bore 36 has multiple minimum diameter portions 40, the stepped cylindrical bore 36 is also equipped with a plurality of annular piston sealing rings 64. Each of the annular piston sealing rings 64 is mounted to one of the minimum diameter portions 40, and forms a sealing land 68 with the concentrically-located and axially-aligned cylindrical reduced diameter portion 60 of the shank 50.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A turbocharger comprising:
    a compressor housing defining a compressor chamber;
    a turbine housing defining a turbine chamber;
    a center housing disposed axially between the compressor housing and the turbine housing;
    a turbine wheel disposed in the turbine chamber;
    a turbine shaft connected to the turbine wheel;
    a compressor wheel disposed in the compressor chamber and connected to the turbine shaft opposite from the turbine wheel, the compressor wheel having a shank with a cylindrical outer diameter portion and a cylindrical reduced diameter portion, the cylindrical reduced diameter portion having a diameter smaller than the cylindrical outer diameter portion; and
    a backplate mounted to the compressor housing adjacent to the compressor wheel, wherein the annular backplate defines a stepped cylindrical bore having a maximum diameter portion and a minimum diameter portion, the minimum diameter portion extends radially inward from the maximum diameter portion and has a diameter smaller than the maximum diameter portion, the cylindrical outer diameter portion is disposed within the maximum diameter portion, and the cylindrical reduced diameter portion is disposed within the minimum diameter portion, and wherein the cylindrical outer diameter of the compressor wheel is greater than or equal to the minimum diameter portion of the annular backplate, and
    wherein the stepped cylindrical bore and the shank define a gap having a variable width.

2. The turbocharger of claim 1 wherein the gap between the cylindrical outer diameter portion and the cylindrical reduced diameter portion of the compressor wheel define a circuitous blowby path with the maximum diameter portion and the minimum diameter portion of the annular backplate.

3. The turbocharger of claim 2 further comprising a bearing disposed between the annular backplate and the compressor housing, the bearing rotatably supporting the turbine shaft, and separated from the compressor wheel by an annular washer.

4. The turbocharger of claim 3 further comprising:
    an annular piston ring seal disposed within and in contact with the minimum diameter portion of the stepped cylindrical bore, wherein the stepped cylindrical bore forms a sealing land between the annular piston ring seal and the cylindrical reduced diameter portion of the compressor wheel.

5. The turbocharger of claim 4 wherein the sealing land defines a portion of the circuitous blowby path having a predetermined shape and a predetermined path length selected to substantially eliminate blowby from a high-pressure zone in the compressor housing through the center housing to a low-pressure zone in the turbine housing, wherein the high-pressure zone is at a higher atmospheric pressure than the low-pressure zone.

6. The turbocharger of claim 4 wherein the cylindrical reduced diameter portion of the compressor wheel has an axial reduced diameter portion width.

7. The turbocharger of claim 6 wherein the annular piston ring seal has an axial ring width, and the minimum diameter portion has an axial step width, and wherein the axial ring width is greater than the axial step width, and wherein the axial reduced diameter portion width is greater than the axial ring width.

8. The turbocharger of claim 4 wherein the stepped cylindrical bore further comprises an outward-facing surface extending radially inward towards the turbine shaft from the maximum diameter portion to the minimum diameter portion of the stepped cylindrical bore, and the minimum diameter portion extends axially towards the center housing to an inward-facing surface that extends radially away from the turbine shaft.

9. The turbocharger of claim 4 wherein the stepped cylindrical bore of the annular backplate is axially aligned within and extends radially towards the cylindrical reduced diameter portion of the compressor wheel.

10. The turbocharger of claim 4 wherein an outward-facing surface extends perpendicularly to the stepped cylindrical bore, and the minimum diameter portion perpendicularly to both the outward-facing surface and the inward-facing surface, and wherein the outward-facing surface and the stepped cylindrical bore are joined at a radiused portion, wherein the radiused portion has a predetermined radius that prevents the compressor wheel from binding against the annular backplate.

11. A turbocharger comprising:
a compressor housing;
a turbine housing;
a center housing disposed axially between the compressor housing and the turbine housing, wherein the center housing includes a circumferentially extending wall defining a cavity, the cavity having opposite ends facing the compressor housing and the turbine housing respectively, one of the opposite ends facing the compressor housing being an open end;
a bearing disposed within the cavity and supported by the circumferentially extending wall;
a shaft extending from a compressor end proximate the compressor housing to a turbine end proximate the turbine housing, the turbine shaft being rotatably supported by the bearing;
an annular backplate separate from each of the compressor housing, the turbine housing, and the center housing, the annular backplate disposed in the open end and damped to the compressor housing by a fastener;
a compressor wheel mounted on the compressor end of the turbine shaft, the compressor wheel having a cylindrical outer diameter portion and a reduced diameter portion, the cylindrical reduced diameter portion having a diameter smaller than the cylindrical outer diameter; and
a turbine wheel mounted to the turbine end of the turbine shaft, and
wherein the annular backplate defines a stepped cylindrical bore including one or more minimum diameter portions extending radially inward from one or more maximum diameter portions of the stepped cylindrical bore towards the compressor wheel and the turbine shaft, and wherein the compressor wheel includes a shank having one or more cylindrical outer diameter portions and one or more reduced diameter portions, and the cylindrical outer diameter portion of the compressor wheel is greater than or equal to the one or more minimum diameter portions of the annular backplate, and wherein the stepped cylindrical bore and the one or more reduced diameter portions define a circuitous blowby path.

12. The turbocharger of claim 11 wherein the one or more cylindrical outer diameter portions are disposed concentrically within the stepped cylindrical bore.

13. The turbocharger of claim 12 further comprising:
an annular piston ring seal disposed on the one or more minimum diameter portions of the annular backplate, the annular piston ring seal located within and in rotatable sealing engagement with one or more reduced diameter portions of the shank, wherein the one or more reduced diameter portions form a sealing land between the annular piston ring seal and the stepped cylindrical bore.

14. The turbocharger of claim 13 wherein the reduced diameter portion has an axial reduced diameter portion width, the annular piston ring seal has an axial ring width, and the one or more minimum diameter portions have an axial step width, and wherein the axial ring width is greater than the axial step width, and wherein the axial reduced diameter portion width is greater than the axial ring width.

15. The turbocharger of claim 13 wherein the one or more minimum diameter portions of the annular backplate are axially aligned within and extend radially towards the one or more cylindrical reduced diameter portions of the shank of the compressor wheel.

16. The turbocharger of claim 13 wherein the one or more minimum diameter portions are connected to the one or more maximum diameter portions by an outward-facing surface extending radially inward towards the turbine shaft from the one or more maximum diameter portions, and the one or more minimum diameter portions extend axially towards the center housing to an inward-facing surface that extends radially outward and away from the turbine shaft.

17. The turbocharger of claim 15 wherein the outward-facing surface extends perpendicularly to the stepped cylindrical bore, and the minimum diameter portion extends perpendicularly to both the outward-facing surface and the inward-facing surface.

18. The turbocharger of claim 17 wherein the outward-facing surface and the stepped cylindrical bore are joined at a radiused portion, and the radiused portion has a predetermined radius that prevents the compressor wheel from binding against the annular backplate.

19. The turbocharger of claim 13 wherein the circuitous blowby path has a shape and path length selected to reduce or substantially eliminate blowby from a high-pressure zone in the compressor housing through the center housing to a low-pressure zone in the turbine housing, and wherein a portion of the circuitous blowby path is defined by a sealing land between the annular piston ring seal and the stepped cylindrical bore.

20. A turbocharger comprising:
- a compressor housing;
- a turbine housing;
- a center housing disposed axially between the compressor housing and the turbine housing, wherein the center housing including a circumferentially extending wall defining a cavity, the cavity having opposite ends facing the compressor housing and the turbine housing respectively, one of the opposite ends facing the compressor housing being an open end;
- a bearing disposed within the cavity and supported by the circumferentially extending wall;
- a shaft extending from a compressor end proximate the compressor housing to a turbine end proximate the turbine housing, the turbine shaft being rotatably supported by the bearing;
- a compressor wheel mounted on the compressor end of the turbine shaft, the compressor wheel having a cylindrical outer diameter portion and a reduced diameter portion, wherein the cylindrical reduced diameter portion has a diameter smaller than the cylindrical outer diameter portion;
- a turbine wheel mounted to the turbine end of the turbine shaft;
- an annular backplate separate from each of the compressor housing, the turbine housing, and the center housing, the annular backplate disposed in the open end and damped to the compressor housing, the annular backplate defining a stepped cylindrical bore having one or more minimum diameter portions extending radially inward from the stepped cylindrical bore; and
- one or more annular piston ring seals disposed within and in contact with the one or more minimum diameter portions, a diameter of the one or more minimum diameter portions is equal to or smaller than the cylindrical outer diameter portion of the compressor wheel, and the one or more minimum diameter portions and the one or more annular piston ring seals form one or more sealing lands with the compressor wheel,
- wherein the stepped cylindrical bore and the one or more reduced diameter portions define a circuitous blowby path having a predetermined shape and a predetermined path length which substantially eliminates blowby from a high-pressure zone in the compressor housing through the center housing to a low-pressure zone in the turbine housing, wherein the high-pressure zone is at higher atmospheric pressure than the low-pressure zone, and wherein a portion of the circuitous blowby path is defined by a sealing land between the annular piston ring seal and the stepped cylindrical bore.

* * * * *